(12) United States Patent
Ellgas et al.

(10) Patent No.: US 11,433,872 B2
(45) Date of Patent: Sep. 6, 2022

(54) THERMAL MANAGEMENT OF HYBRID VEHICLE

(71) Applicant: Waymo LLC, Mountain View, CA (US)

(72) Inventors: Simon Ellgas, San Jose, CA (US); Andrew Warburton, Pleasanton, CA (US)

(73) Assignee: Waymo LLC, Mountain View, CA (US)

(*) Notice: Subject to any disclaimer, the term of this patent is extended or adjusted under 35 U.S.C. 154(b) by 163 days.

(21) Appl. No.: 16/181,225

(22) Filed: Nov. 5, 2018

(65) Prior Publication Data

US 2019/0135266 A1    May 9, 2019

Related U.S. Application Data

(60) Provisional application No. 62/582,421, filed on Nov. 7, 2017.

(51) Int. Cl.
*B60W 20/15* (2016.01)
*B60W 10/06* (2006.01)
*B60W 10/08* (2006.01)

(52) U.S. Cl.
CPC .......... *B60W 20/15* (2016.01); *B60W 10/06* (2013.01); *B60W 10/08* (2013.01); (Continued)

(58) Field of Classification Search
CPC ...... B60W 20/15; B60W 10/06; B60W 10/08; B60W 2552/15; B60W 2554/00;
(Continued)

(56) References Cited

U.S. PATENT DOCUMENTS 9,573,580 B2 * 2/2017 Seto .................. B60L 50/62
2006/0267552 A1 11/2006 Baer et al.
(Continued)

FOREIGN PATENT DOCUMENTS

EP        2644469 A1    10/2013
JP        2004204707 A   7/2004
(Continued)

OTHER PUBLICATIONS

International Search Report and Written Opinion dated Mar. 4, 2019, issued in connection with International Application No. PCT/US2018/059378, filed on Nov. 6, 2018.

*Primary Examiner* — Jess Whittington
(74) *Attorney, Agent, or Firm* — McDonnell Boehnen Hulbert & Berghoff LLP

(57) ABSTRACT

An example method includes making a first determination that a load of a cooling system of a vehicle is expected to increase and become greater than a capacity of the cooling system; operating, in response to making the first determination, the vehicle in a first mode where a combustion engine and an electric motor operate such that a charge level of a power supply of the vehicle increases or is maintained above a threshold charge level; making, after operating the vehicle in the first mode, a second determination that the load of the cooling system has become greater than the capacity of the cooling system; and operating, in response to making the second determination, the vehicle in a second mode where the combustion engine and the electric motor operate such that the charge level of the power supply decreases or is maintained below the threshold charge level.

20 Claims, 4 Drawing Sheets

(52) U.S. Cl.
CPC ..... *B60W 2552/15* (2020.02); *B60W 2554/00* (2020.02); *B60W 2710/30* (2013.01)

(58) Field of Classification Search
CPC ......... B60W 2710/30; B60W 2510/06; B60W 2510/0676; B60W 30/182; B60W 30/188; B60W 30/184; B60W 50/0097; B60W 30/00; B60K 11/06; B60K 6/24; B60K 6/26; B60K 6/28; B60Y 2200/91
See application file for complete search history.

(56) References Cited

U.S. PATENT DOCUMENTS

| | | | |
|---|---|---|---|
| 2007/0204601 A1 | 9/2007 | Ishii et al. | |
| 2007/0261648 A1* | 11/2007 | Reckels | F01P 7/167 123/41.12 |
| 2011/0282527 A1* | 11/2011 | Inbarajan | B60L 53/00 701/22 |
| 2012/0041627 A1* | 2/2012 | Kelty | B60L 15/2045 701/22 |
| 2014/0172216 A1* | 6/2014 | Seto | B60W 10/06 701/22 |
| 2015/0066236 A1* | 3/2015 | Gehring | G01C 21/3469 701/1 |
| 2016/0068074 A1* | 3/2016 | Frank | B60L 1/006 180/65.265 |
| 2017/0129344 A1 | 5/2017 | Islinger et al. | |

FOREIGN PATENT DOCUMENTS

| | | |
|---|---|---|
| JP | 2004324613 A | 11/2004 |
| JP | 2005083300 A | 3/2005 |
| JP | 2007053051 A | 3/2007 |
| JP | 2014118079 A | 6/2014 |
| JP | 2015182569 * | 1/2015 |
| JP | 2015182569 A | 10/2015 |
| JP | 2016192846 A | 11/2016 |
| KR | 10-1998-0053909 A | 9/1998 |
| WO | 2011014473 A1 | 2/2011 |
| WO | 2014158823 A1 | 10/2014 |

* cited by examiner

THERMAL MANAGEMENT OF HYBRID VEHICLE

CROSS-REFERENCE TO RELATED APPLICATIONS

This application claims priority to U.S. Provisional Patent Application No. 62/582,421, filed Nov. 7, 2017, which is incorporated herein by reference in its entirety and for all purposes.

BACKGROUND

Unless otherwise indicated herein, the materials described in this section are not prior art to the claims in this application and are not admitted to be prior art by inclusion in this section.

A common type of hybrid vehicle includes a combustion engine and an electric motor powered by a power supply (e.g., a battery or a capacitor bank). The combustion engine and/or the electric motor may be used to power the vehicle's drivetrain. In some examples, the combustion engine is configured to power the drivetrain directly, and in other examples the combustion engine is configured to power the drivetrain indirectly by charging the power supply so that the power supply can power the electric motor. Instead of using friction between a wheel and a brake pad (and the resultant heat loss) to decelerate the vehicle, some hybrid vehicles are configured for regenerative braking in which the kinetic energy of the vehicle can be converted into electrical energy and stored by the power supply. In plug-in hybrid vehicles, the power supply can also be charged by connecting the power supply to an external power source (e.g., a wall outlet). In some cases, it is preferable for the power supply to power the drivetrain and to use the combustion engine only when needed to charge the power supply (e.g., while driving), because the cost per mile associated with electrically supplied energy might be lower than the cost per mile associated with the combustion engine. The electricity stored by the power supply might also be produced in a carbon-reduced or a carbon-neutral manner.

The operation of the combustion engine typically represents much of the heat rejection load that the hybrid vehicle's cooling system handles. Operating the combustion engine on a reduced or as-needed basis generally allows the hybrid vehicle's cooling system to be less complex, bulky, and/or costly than a cooling system that might be required for a conventional combustion engine vehicle. However, the hybrid vehicle may sometimes operate in conditions involving extreme heat, heavy traffic, steep road grades, or adverse road conditions (e.g., road construction) that result in an additional heat rejection load for the cooling system. If these conditions occur while the combustion engine is burning fuel to charge the power supply, the increased heat rejection load may surpass what the cooling system was designed to handle.

SUMMARY

In a first example, a hybrid vehicle includes a drivetrain, an electric motor (e.g., one or more electric motors) configured to power the drivetrain, a power supply configured to power the electric motor(s), a combustion engine configured to charge the power supply and to power the drivetrain, a cooling system (e.g., a cooling system having several separated cooling loops), one or more processors, and a computer-readable medium storing instructions that, when executed by the one or more processors, cause the hybrid vehicle to perform functions. The functions include making a first determination that a heat rejection load of the cooling system is expected to increase and become greater than a heat rejection capacity of the cooling system based on expected operating conditions of the hybrid vehicle. The functions further include operating, in response to making the first determination, the hybrid vehicle in a first mode where the combustion engine and the electric motor(s) operate such that a charge level of the power supply increases or is maintained above a threshold charge level. The functions further include making, after operating the hybrid vehicle in the first mode, a second determination that the heat rejection load of the cooling system has become greater than the heat rejection capacity of the cooling system. The functions further include operating, in response to making the second determination, the hybrid vehicle in a second mode where the combustion engine and the electric motor(s) operate such that the charge level of the power supply decreases or is maintained below the threshold charge level.

In a second example, a method of operating a hybrid vehicle includes making a first determination that a heat rejection load of a cooling system of the hybrid vehicle is expected to increase and become greater than a heat rejection capacity of the cooling system based on expected operating conditions of the hybrid vehicle. The method further includes operating, in response to making the first determination, the hybrid vehicle in a first mode where a combustion engine of the hybrid vehicle and an electric motor (e.g., one or more electric motors) of the hybrid vehicle operate such that a charge level of a power supply of the hybrid vehicle increases or is maintained above a threshold charge level. The method further includes making, after operating the hybrid vehicle in the first mode, a second determination that the heat rejection load of the cooling system has become greater than the heat rejection capacity of the cooling system. The method further includes operating, in response to making the second determination, the hybrid vehicle in a second mode where the combustion engine and the electric motor(s) operate such that the charge level of the power supply decreases or is maintained below the threshold charge level.

In a third example, a non-transitory computer readable medium stores instructions that, when executed by one or more processors of a hybrid vehicle, cause the hybrid vehicle to perform functions. The functions include making a first determination that a heat rejection load of a cooling system of the hybrid vehicle is expected to increase and become greater than a heat rejection capacity of the cooling system based on expected operating conditions of the hybrid vehicle. The functions further include operating, in response to making the first determination, the hybrid vehicle in a first mode where a combustion engine of the hybrid vehicle and an electric motor (e.g., one or more electric motors) of the hybrid vehicle operate such that a charge level of a power supply of the hybrid vehicle increases or is maintained above a threshold charge level. The functions further include making, after operating the hybrid vehicle in the first mode, a second determination that the heat rejection load of the cooling system has become greater than the heat rejection capacity of the cooling system. The functions further include operating, in response to making the second determination, the hybrid vehicle in a second mode where the combustion engine and the electric motor(s) operate such that the charge level of the power supply decreases or is maintained below the threshold charge level.

Other aspects, embodiments, and implementations will become apparent to those of ordinary skill in the art by reading the following detailed description, with reference where appropriate to the accompanying drawings.

DETAILED DESCRIPTION

Figure 1:
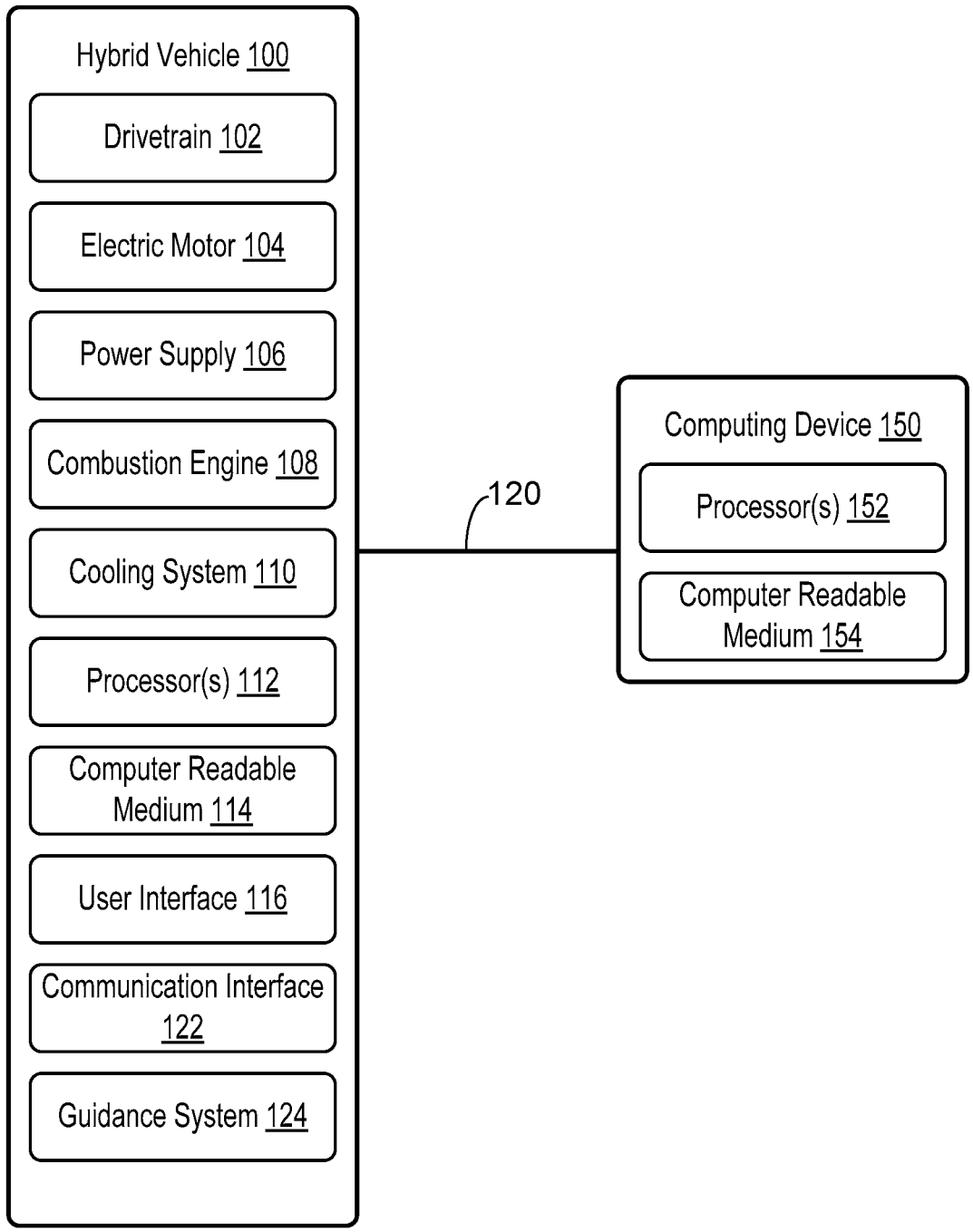
FIG. 1 is a schematic illustration of a hybrid vehicle and a computing device, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

I. Overview

One procedure for operating a hybrid vehicle includes recharging the power supply (e.g., a battery or a capacitor bank) when the charge level of the power supply becomes less than a threshold charge level (e.g., 15% of full charge). In some hybrid vehicles, recharging can occur by connecting or "plugging in" the power supply to an external power supply. Recharging the power supply while the hybrid vehicle is in motion generally involves running the hybrid vehicle's combustion engine to generate electricity to be stored by the power supply.

The cooling system of the hybrid vehicle typically has a heat rejection capacity large enough to dissipate heat that is generated by intermittent operation of the combustion engine for charging the power supply. (As used herein, "charging the power supply" may refer to any situation where the combustion engine is operating to provide energy to the power supply, whether the overall charge level of the power supply is increasing, being maintained substantially constant, or being depleted. The cooling system might also be capable of dissipating the heat generated by steadily running the combustion engine for relatively long periods of time to maintain a high charge level (e.g., 85%) for the power supply. However, the cooling system might not have a heat rejection capacity large enough to dissipate the heat rejection load present when the combustion engine is burning fuel over extended periods of time to charge the power supply under certain operating conditions such as extreme heat, heavy traffic, steep road grades, or adverse road conditions (e.g., road construction). For example, extreme heat may slow the transfer of heat between the radiator and the surrounding air. Heavy traffic may prevent the hybrid vehicle from travelling at higher speeds that would increase airflow over the radiator. Steep uphill road grades may result in increased power output from the combustion engine and associated heat generation. Adverse road conditions such as road construction may also prevent the hybrid vehicle from travelling at higher speeds that would increase airflow over the radiator. If the hybrid vehicle encounters such operating conditions while the power supply is in a low state of charge, operating the combustion engine to charge the power supply may cause overheating of the combustion engine or other vehicle components.

To help alleviate this problem, a method for operating a hybrid vehicle is disclosed herein. The method includes making a first determination that a heat rejection load of a cooling system of the hybrid vehicle is expected to increase and become greater than a heat rejection capacity of the cooling system based on expected operating conditions of the hybrid vehicle. The method further includes operating, in response to making the first determination, the hybrid vehicle in a first mode where a combustion engine of the hybrid vehicle and an electric motor (e.g., one or more electric motors) of the hybrid vehicle operate such that a charge level of a power supply of the hybrid vehicle increases or is maintained above a threshold charge level. The method further includes making, after operating the hybrid vehicle in the first mode, a second determination that the heat rejection load of the cooling system has become greater than the heat rejection capacity of the cooling system. The method further includes operating, in response to making the second determination, the hybrid vehicle in a second mode where the combustion engine and the electric motor operate such that the charge level of the power supply decreases or is maintained below the threshold charge level.

For example, the hybrid vehicle may be loaded with an itinerary of its upcoming trip or service area. By accessing data reflecting weather forecasts, traffic forecasts, road grades, and/or road construction corresponding to the times and locations defined by the itinerary, the hybrid vehicle can charge its power supply proactively, so that the power supply will have a high level of charge when the hybrid vehicle encounters such adverse operating conditions. This makes overheating of the combustion engine or other vehicle components less likely.

II. Example Systems

FIG. 1 is a schematic illustration of a hybrid vehicle 100 and a computing device 150, according to an example embodiment.

The hybrid vehicle 100 includes a drivetrain 102, an electric motor 104, a power supply 106, a combustion engine 108, a cooling system 110, one or more processors 112, a computer readable medium 114, a user interface 116, a communication interface 122, and a guidance system 124.

The drivetrain 102 includes elements that are configured to transmit mechanical power from the electric motor 104 and/or the combustion engine 108 to wheels and/or tires (not shown) of the hybrid vehicle 100. To this end, the drivetrain 102 could include a gearbox, a clutch, a differential, axles, and/or drive shafts, among other possibilities.

The electric motor 104 is configured to power the drivetrain 102. For example, the electric motor 104 may be configured to receive electrical current from the power supply 106 and convert the electrical current into kinetic energy that is transferred to the drivetrain 102.

The power supply 106 is configured to power the electric motor 104. The power supply 106 may include a battery and/or a capacitor bank. Other examples are possible.

The combustion engine 108 is configured to charge the power supply 106 (e.g., via a generator) and/or to power the drivetrain 102. The combustion engine 108 may be configured to burn gasoline, diesel, kerosene, propane, and/or other hydrocarbon or non-hydrocarbon fuels.

The cooling system 110 is configured to remove heat from various components (e.g., the combustion engine 108) of the hybrid vehicle 100. The cooling system 110 may include a water-cooled or air-cooled radiator, or one or more (e.g., separated) cooling loops, for example.

The one or more processors 112 may include one or more general-purpose microprocessors and/or one or more special purpose microprocessors. The one or more processors 112 may include, for instance, an application-specific integrated circuit (ASIC) or a field-programmable gate array (FPGA). Other types of processors, computers, or devices configured to carry out software instructions are contemplated herein.

The computer readable medium 114 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The one or more processors 112 may be configured to execute program instructions stored by the computer readable medium 114 so as to carry out operations. As such, the one or more processors 112 may be configured to carry out any or all of the operations described herein.

The user interface 116 may include output components such as a display screen and/or speakers, and input components such as a keypad, a touchscreen, a microphone, buttons, and/or control knobs. The user interface 116 may be configured to provide informational output to a user and/or receive informational input from the user.

The hybrid vehicle 100 may additionally include a communication interface 122. The communication interface 122 may be configured to provide communication between the hybrid vehicle 100 and other systems, such as the computing device 150, one or more computing networks, and/or other vehicles. In some embodiments, the communication interface 122 could provide a communication link between various elements of the hybrid vehicle 100.

The communication interface 122 could be, for example, a system configured to provide wired or wireless communication between one or more other vehicles, sensors, or other entities, either directly or via a communication network. To this end, the communication interface 122 may include an antenna and a chipset for communicating with the other vehicles, sensors, computing devices, or other entities either directly or via the communication network 120. The chipset or communication interface 122 in general may be arranged to communicate according to one or more types of wireless communication (e.g., protocols) such as BLUETOOTH, BLUETOOTH LOW ENERGY (BLE), communication protocols described in IEEE 802.11 (including any IEEE 802.11 revisions), cellular technology (such as GSM, CDMA, UMTS, EV-DO, WiMAX, or LTE), ZIGBEE, dedicated short range communications (DSRC), and radio frequency identification (RFID) communications, among other possibilities. The communication interface 122 may take other forms as well.

The hybrid vehicle 100 additionally includes a guidance system 124. The guidance system 124 may include a GPS, an inertial measurement unit (IMU), a gyroscope, and/or another type of device configured to provide information indicative of a location or pose of the hybrid vehicle 100. The GPS may be any sensor (e.g., location sensor) configured to estimate a geographic location of the hybrid vehicle 100. To this end, the GPS may include a transceiver configured to estimate a position of the hybrid vehicle 100 with respect to the Earth. The GPS may take other forms as well. The IMU may include a combination of sensors configured to sense position and orientation changes of the hybrid vehicle 100 based on inertial acceleration. In some embodiments, the combination of sensors may include, for example, accelerometers and gyroscopes. Other combinations of sensors are possible as well.

The guidance system 124 may include various navigation and pathing capabilities, which may determine, at least in part, a driving path for the hybrid vehicle 100. The guidance system 124 may additionally be configured to update the driving path dynamically while the hybrid vehicle 100 is in operation. In some embodiments, the guidance system 124 may be configured to incorporate data from sensors, the GPS, a LIDAR system, and one or more predetermined maps so as to determine the driving path for the hybrid vehicle 100. Guidance system 124 may also include an obstacle avoidance system, which may be configured to identify, evaluate, and avoid or otherwise negotiate obstacles in the environment in which the hybrid vehicle 100 is located. The hybrid vehicle 100 may additionally or alternatively include components other than those shown.

The computing device 150 includes one or more processors 152 and at least one computer readable medium 154. The computing device 150 may include an external computer, or a mobile computing platform, such as a smartphone, tablet device, personal computer, wearable device, etc. Additionally or alternatively, the computing device 150 may include, or be connected to, a remotely-located computer system, such as a cloud computing device. In an example embodiment, the computing device 150 may be configured to carry out some or all method blocks or steps described herein.

III. Example Methods

Figure 2:
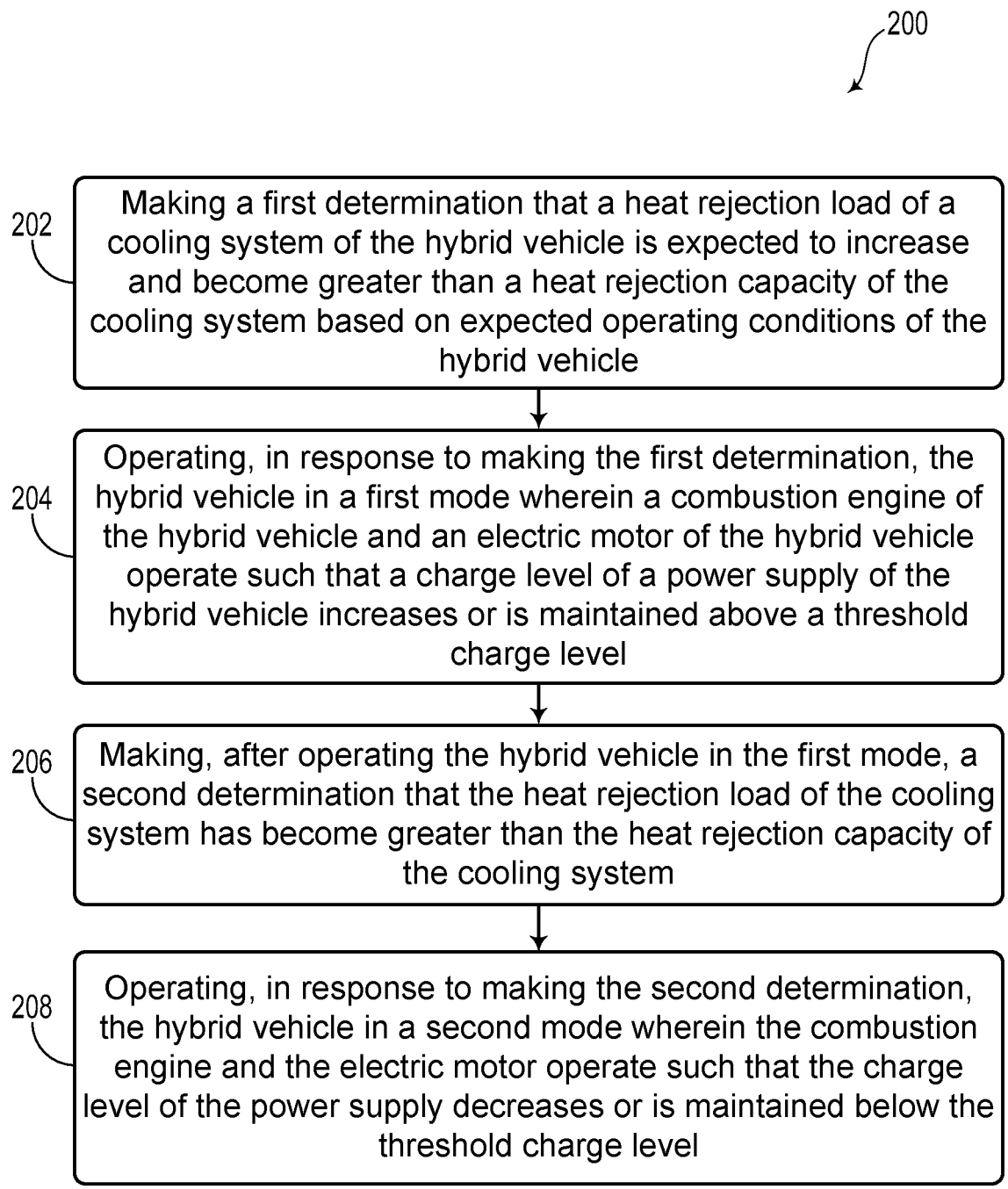
FIG. 2 is a block diagram of a method, according to an example embodiment.

FIG. 2 illustrates a method 200 of operating a hybrid vehicle, according to an example embodiment. Method 200 may be carried out, in full or in part, by the hybrid vehicle 100 and/or the computing device 150. It will be understood that the method 200 may include fewer or more steps or blocks than those expressly disclosed herein. Furthermore, respective steps or blocks of method 200 may be performed in any order and each step or block may be performed one or more times.

At block 202, the method 200 includes making a first determination that a heat rejection load of a cooling system of the hybrid vehicle is expected to increase and become greater than a heat rejection capacity of the cooling system based on expected operating conditions of the hybrid vehicle.

For example, the hybrid vehicle 100 may make a first determination that a heat rejection load of a cooling system 110 of the hybrid vehicle 100 is expected to increase and become greater than a heat rejection capacity of the cooling system 110 based on expected operating conditions of the hybrid vehicle 100.

The heat rejection load may be quantified in units of watts or British thermal units per hour (BTU/hr), for example. The heat rejection load may represent a rate at which the hybrid vehicle 100 is generating heat during operation or a target rate of heat removal for the cooling system 110. The heat rejection capacity may similarly be quantified in units of watts or BTU/hr and may represent a (e.g., maximum) rate at which the cooling system 110 can remove heat from the hybrid vehicle 100 (e.g., the combustion engine 108).

In some examples, the hybrid vehicle 100 may receive, from the computing device 150, a notification that the heat rejection load of the cooling system 110 is expected to increase (e.g., after some initial duration of travel) and become greater than the (e.g., static) heat rejection capacity of the cooling system 110 based on expected operating conditions of the hybrid vehicle 100. In this context, making the first determination may involve the hybrid vehicle 100 using the received notification to make the first determination. For example, the computing device 150 may take the form of a server that communicates with and/or directs other fleet vehicles that are similar to the hybrid vehicle 100.

Additionally or alternatively, the hybrid vehicle 100 may receive data representing a heat rejection load corresponding to expected operating conditions of the hybrid vehicle 100. In this context, making the first determination may include determining that the heat rejection load represented by the received data is expected to become greater than the heat rejection capacity of the cooling system 110. In a specific example, the hybrid vehicle 100 may receive data indicating an expected heat rejection load of 'x' watts, and determine that the heat rejection load of the cooling system 110 is expected to become greater than the heat rejection capacity of the cooling system 110 based on the heat rejection capacity being equal to 'y' which is less than 'x.'

In some examples, the received data might not include data explicitly indicating the expected heat rejection load of the cooling system 110. For example, the received data may include data indicating one or more of an expected temperature associated with the cooling system 110, an expected air temperature associated with the hybrid vehicle 100, an expected traffic congestion level associated with the hybrid vehicle 100, an expected road grade associated with the hybrid vehicle 100, expected road conditions associated with the hybrid vehicle 100, or an expected speed of the hybrid vehicle 100. The hybrid vehicle 100 may use this information to infer the expected heat rejection load of the cooling system 110 and compare the expected heat rejection load to the heat rejection capacity of the cooling system 110, for example. In other examples, the computer readable medium 114 may include a data table that classifies certain cooling system temperatures, air temperatures, traffic congestion levels, road grades, road conditions, and/or speeds as indicators that the heat rejection load of the cooling system 110 is expected to become greater than the heat rejection capacity of the cooling system 110.

In a particular example, the received data indicates an expected temperature associated with the cooling system. In this context, determining that the heat rejection load represented by the received data is expected to become greater than the heat rejection capacity of the cooling system 110 may include determining that the temperature indicated by the received data is greater than or equal to a threshold cooling system temperature (e.g., 250° Fahrenheit).

Additionally or alternatively, the received data may indicate an expected air temperature associated with the hybrid vehicle 100. In this context, determining that the heat rejection load represented by the received data is expected to become greater than the heat rejection capacity of the cooling system 110 may include determining that the temperature indicated by the received data is greater than or equal to a threshold air temperature (e.g., 100° Fahrenheit).

In some examples, the received data may indicate an expected traffic congestion level (e.g., low, normal, medium, high) associated with the hybrid vehicle 100. In this context, determining that the heat rejection load represented by the received data is expected to become greater than the heat rejection capacity of the cooling system 110 may include determining that the traffic congestion level indicated by the received data is greater than or equal to a threshold traffic congestion level (e.g., normal).

Additionally or alternatively, the received data may indicate an expected road grade (e.g., 10%) associated with the hybrid vehicle 100. In this context, determining that the heat rejection load represented by the received data is expected to become greater than the heat rejection capacity of the cooling system 110 may include determining that the road grade indicated by the received data is greater than or equal to a threshold road grade (e.g., 8%).

In some examples, the received data indicates an expected speed associated with the hybrid vehicle 100. In this context, determining that the heat rejection load represented by the received data is expected to become greater than the heat rejection capacity of the cooling system 110 may include determining that the speed indicated by the received data is less than a threshold speed (e.g., 15 miles per hour).

The method 200 may also include requesting (e.g., from the computing device 150) heat rejection load data that corresponds with an itinerary of the hybrid vehicle 100. In this context, the data may be received in response to the request.

In some examples, before operating the hybrid vehicle 100 in a first mode where the combustion engine 108 and the electric motor 104 operate such that a charge level of the power supply 106 increases or is maintained above a threshold charge level, the hybrid vehicle 100 may confirm that current operating conditions are suitable for operating in the first mode. As such, making the first determination may additionally include the hybrid vehicle 100 determining that the heat rejection load of the cooling system 110 is currently less than or equal to a heat rejection capacity of the cooling system 110.

In some examples, the hybrid vehicle 100 may receive data (e.g., from on-board temperature sensors, an accelerometer, a speedometer, other sensors, databases stored by the computing device 150) representing a heat rejection load corresponding to current operating conditions of the hybrid vehicle 100. In this context, making the first determination may include the hybrid vehicle 100 determining that the current heat rejection load represented by the received data is less than or equal to the heat rejection capacity of the cooling system 110. In a specific example, the hybrid vehicle 100 may receive data indicating a current heat rejection load of 'x' watts, and determine that the heat rejection load of the cooling system 110 is less than the heat rejection capacity of the cooling system 110 based on the heat rejection capacity being equal to 'y' which is greater than 'x.'

In some examples, the received data might not include data explicitly indicating the current heat rejection load of the cooling system 110. For example, the received data may include data indicating one or more of a temperature currently associated with the cooling system 110, an (e.g., ambient) air temperature currently associated with the hybrid vehicle 100, a traffic congestion level currently associated with the hybrid vehicle 100, a road grade currently associated with the hybrid vehicle 100, road conditions currently associated with the hybrid vehicle 100, or a current speed of the hybrid vehicle 100. The hybrid vehicle 100 may use this information to infer the current heat rejection load of the cooling system 110 and compare the current heat rejection load to the heat rejection capacity of the cooling system 110, for example. In other examples, the computer readable medium 114 may include a data table that classifies certain cooling system temperatures, air temperatures, traffic congestion levels, road grades, road conditions, and/or speeds as indicators that the current heat rejection load of the cooling system 110 is less than the heat rejection capacity of the cooling system 110. That is, the hybrid vehicle 100 may use any of the above information to determine whether the current operating conditions of the hybrid vehicle 100 are suitable for operating in a first mode where the combustion engine 108 and the electric motor 104 operate such that a charge level of the power supply 106 increases or is maintained above a threshold charge level.

In particular examples, the received data indicates a temperature currently associated with the cooling system 110. In this context, determining that the current heat rejection load represented by the received data is less than or equal to the heat rejection capacity of the cooling system 110 may include determining that the temperature indicated by the received data is less than a threshold cooling system temperature (e.g., 250° Fahrenheit).

Additionally or alternatively, the received data may indicate an air temperature currently associated with the hybrid vehicle 100. In this context, determining that the current heat rejection load represented by the received data is less than or equal to the heat rejection capacity of the cooling system 110 may include determining that the temperature indicated by the received data is less than a threshold air temperature (e.g., 100° Fahrenheit).

In some examples, the received data indicates a traffic congestion level currently associated with the hybrid vehicle 100. In this context, determining that the current heat rejection load represented by the received data is less than or equal to the heat rejection capacity of the cooling system 110 may include determining that the traffic congestion level indicated by the received data is less than a threshold traffic congestion level (e.g., medium).

Additionally or alternatively, the received data may indicate a road grade currently associated with the hybrid vehicle 100. In this context, determining that the current heat rejection load represented by the received data is less than or equal to the heat rejection capacity of the cooling system 110 may include determining that the road grade indicated by the received data is less than a threshold road grade (e.g., 8%).

In some examples, the received data indicates a current speed of the hybrid vehicle 100. In this context, determining that the heat rejection load represented by the received data is less than or equal to the heat rejection capacity of the cooling system 110 may include determining that the speed indicated by the received data is greater than or equal to a threshold speed (e.g., 15 miles per hour).

At block 204, the method 200 includes operating, in response to making the first determination, the hybrid vehicle in a first mode where a combustion engine of the hybrid vehicle and an electric motor of the hybrid vehicle operate such that a charge level of a power supply of the hybrid vehicle increases or is maintained above a threshold charge level.

For example, in response to making the first determination of block 202 described above, the hybrid vehicle 100 may operate in a first mode where the combustion engine 108 of the hybrid vehicle 100 and the electric motor 104 of the hybrid vehicle 100 operate such that a charge level of the power supply 106 of the hybrid vehicle 100 increases or is maintained above a threshold charge level (e.g., 85% of full charge). Generally, the first mode may involve increased operation of the combustion engine 108 to power the drivetrain 102 and/or charge the power supply 106, and decreased use of the electric motor 104 to power the drivetrain 102.

For example, operating the hybrid vehicle 100 in the first mode may include operating the combustion engine 108 at a throttle level that is greater than or equal to a threshold throttle level. In some examples, the threshold throttle level may be defined by a product of the duty cycle and the throttle output of the combustion engine 108. By further example, a throttle output of 90% multiplied by a duty cycle of 90% may correspond to a threshold throttle level of 0.81. In other examples, operating the hybrid vehicle 100 in the first mode may include operating the combustion engine at a 100% duty cycle and/or at a substantially constant throttle level or throttle output.

At block 206, the method 200 includes making, after operating the hybrid vehicle in the first mode, a second determination that the heat rejection load of the cooling system has become greater than the heat rejection capacity of the cooling system.

For example, after operating the hybrid vehicle 100 in the first mode described above, the hybrid vehicle 100 may make a second determination that the heat rejection load of the cooling system 110 has become greater than the heat rejection capacity of the cooling system 110.

In some examples, the hybrid vehicle 100 may receive data (e.g., from on-board temperature sensors, an accelerometer, a speedometer, other sensors, databases stored by the computing device 150) representing a heat rejection load corresponding to current operating conditions of the hybrid vehicle 100. In this context, making the second determination may include the hybrid vehicle 100 determining that the current heat rejection load represented by the received data has become greater than the heat rejection capacity of the cooling system 110. In a specific example, the hybrid vehicle 100 may receive data indicating a current heat rejection load of 'x' watts, and determine that the heat rejection load of the cooling system 110 has become greater than the heat rejection capacity of the cooling system 110 based on the heat rejection capacity being equal to 'y' which is less than 'x.'

In some examples, the received data might not include data explicitly indicating the current heat rejection load of the cooling system 110. For example, the received data may include data indicating one or more of a temperature currently associated with the cooling system 110, an (e.g., ambient) air temperature currently associated with the hybrid vehicle 100, a traffic congestion level currently associated with the hybrid vehicle 100, a road grade currently associated with the hybrid vehicle 100, road conditions currently associated with the hybrid vehicle 100, or a current speed of the hybrid vehicle 100. The hybrid vehicle 100 may use this information to infer the current heat rejection load of the cooling system 110 and compare the current heat rejection load to the heat rejection capacity of the cooling system 110, for example. In other examples, the computer readable medium 114 may include a data table that classifies certain cooling system temperatures, air temperatures, traffic congestion levels, road grades, road conditions, and/or speeds as indicators that the current heat rejection load of the cooling system 110 is greater than the heat rejection capacity of the cooling system 110. That is, the hybrid vehicle 100 may use any of the above information to determine whether the current operating conditions of the hybrid vehicle 100 make it beneficial to operate in a second mode where the combustion engine 108 and the electric motor 104 operate such that the charge level of the power supply 106 decreases or is maintained below the threshold charge level (e.g., 85% of full charge).

In particular examples, the received data indicates a temperature currently associated with the cooling system 110. In this context, determining that the current heat rejection load represented by the received data has become greater than the heat rejection capacity of the cooling system 110 may include determining that the temperature indicated by the received data is greater than a threshold cooling system temperature (e.g., 250° Fahrenheit).

Additionally or alternatively, the received data may indicate an air temperature currently associated with the hybrid vehicle 100. In this context, determining that the current heat rejection load represented by the received data has become greater than the heat rejection capacity of the cooling system 110 may include determining that the temperature indicated by the received data is greater than a threshold air temperature (e.g., 100° Fahrenheit).

In some examples, the received data indicates a traffic congestion level currently associated with the hybrid vehicle 100. In this context, determining that the current heat rejection load represented by the received data has become greater than the heat rejection capacity of the cooling system 110 may include determining that the traffic congestion level indicated by the received data is greater than a threshold traffic congestion level (e.g., medium).

Additionally or alternatively, the received data may indicate a road grade currently associated with the hybrid vehicle 100. In this context, determining that the current heat rejection load represented by the received data has become greater than the heat rejection capacity of the cooling system 110 may include determining that the road grade indicated by the received data is greater than a threshold road grade (e.g., 8%).

In some examples, the received data indicates a current speed of the hybrid vehicle 100. In this context, determining that the heat rejection load represented by the received data has become greater than the heat rejection capacity of the cooling system 110 may include determining that the speed indicated by the received data is less than a threshold speed (e.g., 15 miles per hour).

At block 208, the method 200 includes operating, in response to making the second determination, the hybrid vehicle in a second mode where the combustion engine and the electric motor operate such that the charge level of the power supply decreases or is maintained below the threshold charge level.

For example, in response to making the second determination of block 206 described above, the hybrid vehicle 100 may operate in a second mode where the combustion engine 108 and the electric motor 104 operate such that the charge level of the power supply 106 decreases or is maintained below the threshold charge level (e.g., 85% of full charge).

In some examples, operating the hybrid vehicle 100 in the second mode may include operating the combustion engine 108 at a throttle level that is less than the threshold throttle level described above. Additionally, operating the hybrid vehicle 100 in the second mode may include operating the combustion engine 108 to intermittently cycle between a high throttle level and a lower throttle level.

The method 200 may also involve the hybrid vehicle 100 making, after operating the hybrid vehicle 100 in the second mode, a third determination that the heat rejection load of the cooling system 110 has become less than or equal to the heat rejection capacity of the cooling system 110 and operating, in response to making the third determination, the hybrid vehicle 100 in the first mode described above. The hybrid vehicle 100 may access data and make the third determination in ways that are similar to how the hybrid vehicle 100 can make the first determination or the second determination as described above. Additionally or alternatively, the hybrid vehicle 100 may provide via the user interface 116, an indication requesting that the power supply 106 be recharged via an external power source.

Figure 3:
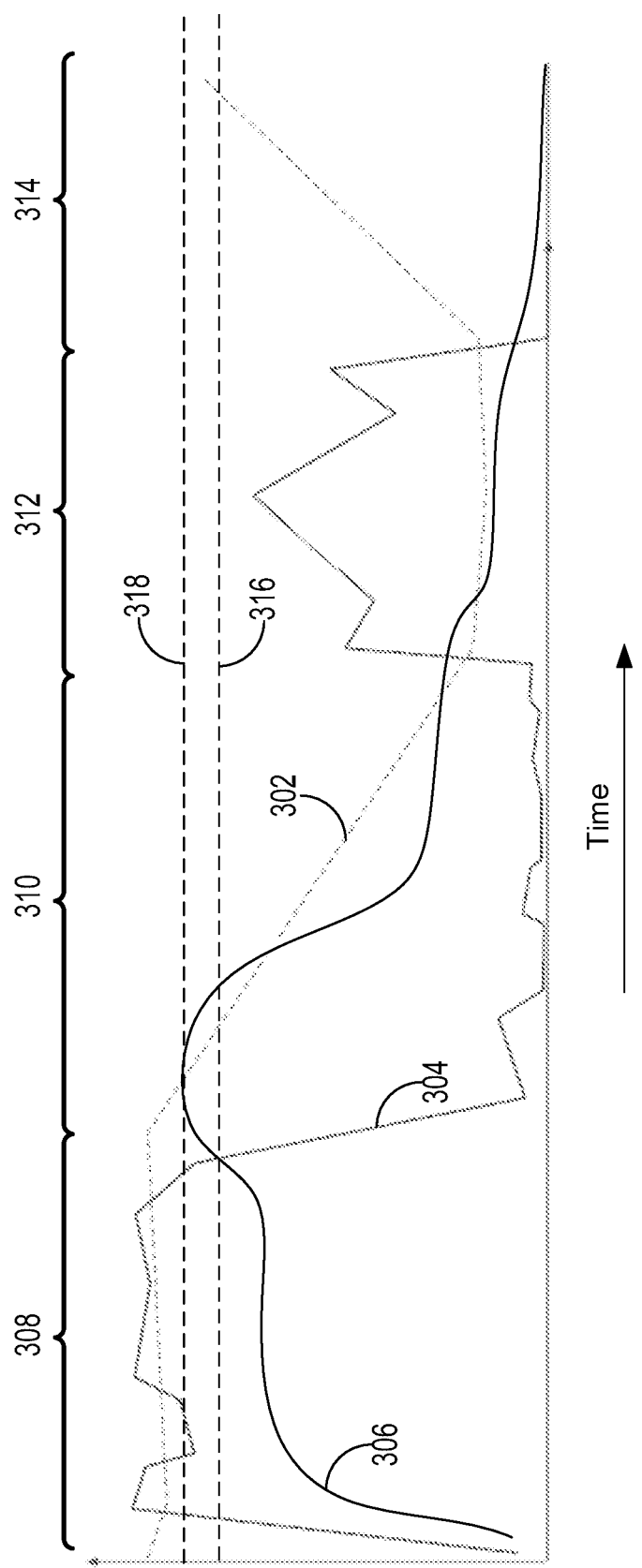
FIG. 3 depicts a charge level of a power supply of a hybrid vehicle over time, a speed of the hybrid vehicle over time, and a heat rejection load of a cooling system of the hybrid vehicle over time, according to an example embodiment.

FIG. 3 depicts a charge level 302 of the power supply 106, a speed 304 of the hybrid vehicle 100, a heat rejection load 306 of the cooling system 110 a heat rejection capacity 316 of the cooling system 110, and a threshold charge level 318 of the power supply 106, according to an example embodiment. More generally, FIG. 3 depicts an example trip of the hybrid vehicle 100.

During time period 308, the hybrid vehicle 100 operates in the first mode where the combustion engine 108 and the electric motor 104 operate such that the charge level 302 is maintained above the threshold charge level 318. The hybrid vehicle 100 may operate in the first mode because the hybrid vehicle has determined that the heat rejection load 306 is expected to increase and become greater than the heat rejection capacity 316. Time period 308 may be associated with highway or high speed driving conditions, for example. During the time period 308, the heat rejection load 306 increases due to operation of the combustion engine, but eventually reaches an equilibrium with the cooling system 110.

During time period 310, the hybrid vehicle 100 operates in the second mode where the combustion engine 108 and the electric motor 104 operate such that the charge level 302 decreases or is maintained below the threshold charge level 318. The hybrid vehicle 100 may operate in the second mode because the hybrid vehicle 100 has determined that the heat rejection load 306 has become greater than the heat rejection capacity 316. Time period 310 may be associated with "stop and go" driving conditions. Due to reduced heat generation by the combustion engine 108, the heat rejection load 306 begins to decrease and level off.

During time period 312, the hybrid vehicle 100 continues to operate in the second mode, although the rate of decrease of the charge level 302 has decreased. Time period 312 may be associated with normal city driving conditions.

During the time period 314 the trip is over, the power supply 106 is plugged into an external power source and the charge level 302 increases.

Figure 4:
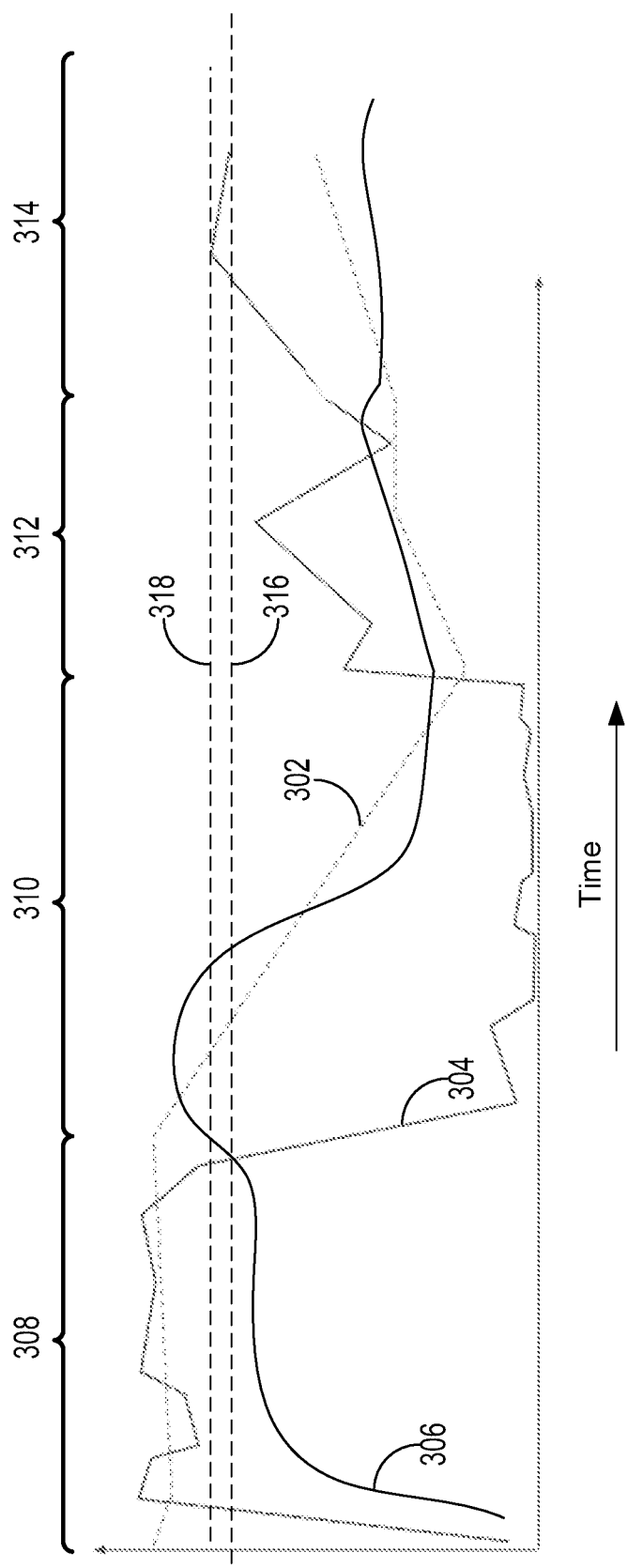
FIG. 4 depicts a charge level of a power supply of a hybrid vehicle over time, a speed of the hybrid vehicle over time, and a heat rejection load of a cooling system of the hybrid vehicle over time, according to an example embodiment.

FIG. 4 depicts a situation that is similar to FIG. 3, with the primary exception being that activities during the time period 312 and the time period 314 differ. In the time period 312 depicted in FIG. 4, the combustion engine begins recharging the power supply (e.g., operating in the first mode). In the time period 314 depicted in FIG. 4, the trip continues and the hybrid vehicle operates in the first mode where the combustion engine 108 and the electric motor 104 operate such that the charge level 302 increases toward the threshold charge level 318.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A hybrid vehicle comprising:
   a drivetrain;
   an electric motor configured to power the drivetrain;
   a power supply configured to power the electric motor;
   a combustion engine configured to charge the power supply and to power the drivetrain;
   a cooling system;
   one or more processors; and
   a computer-readable medium storing instructions that, when executed by the one or more processors, cause the hybrid vehicle to perform functions comprising:
      receiving expected-condition data indicative of one or more expected operating conditions, wherein the one or more expected operating conditions are conditions external to the hybrid vehicle that are expected to be encountered by the hybrid vehicle;
      making a first determination, based on the received expected-condition data, that a heat rejection load of the cooling system is expected to increase and become greater than a heat rejection capacity of the cooling system in response to the hybrid vehicle encountering the one or more expected operating conditions;
      in response to making the first determination and prior to the hybrid vehicle encountering the expected operating conditions, operating the hybrid vehicle in a first mode wherein the combustion engine and the electric motor operate such that a charge level of the power supply increases or is maintained above a threshold charge level;
      making, after operating the hybrid vehicle in the first mode, a second determination that the heat rejection load of the cooling system has become greater than the heat rejection capacity of the cooling system; and
      operating, in response to making the second determination, the hybrid vehicle in a second mode wherein the combustion engine and the electric motor operate such that the charge level of the power supply is below the threshold charge level.

2. The hybrid vehicle of claim 1,
   wherein making the first determination comprises determining that the heat rejection load of the cooling system is currently less than a heat rejection capacity of the cooling system the functions further comprising:
   receiving current-condition data representing a heat rejection load corresponding to current operating conditions of the hybrid vehicle, and
   wherein making the first determination comprises determining that the heat rejection load represented by the received current-condition data is less than the heat rejection capacity of the cooling system.

3. The hybrid vehicle of claim 2, wherein the received current-condition data comprises data indicating one or more of a temperature currently associated with the cooling system, an air temperature currently associated with the hybrid vehicle, a traffic congestion level currently associated with the hybrid vehicle, a road grade currently associated with the hybrid vehicle, road conditions currently associated with the hybrid vehicle, or a current speed of the hybrid vehicle.

4. The hybrid vehicle of claim 2,
   wherein the received current-condition data indicates a temperature currently associated with the cooling system, and
   wherein determining that the heat rejection load represented by the received current-condition data is less than the heat rejection capacity of the cooling system comprises determining that the temperature indicated by the received current-condition data is less than a threshold temperature.

5. The hybrid vehicle of claim 2,
wherein the received current-condition data indicates an air temperature currently associated with the hybrid vehicle, and
wherein determining that the heat rejection load represented by the received current-condition data is less than the heat rejection capacity of the cooling system comprises determining that the temperature indicated by the received current-condition data is less than a threshold temperature.

6. The hybrid vehicle of claim 2,
wherein the received current-condition data indicates a traffic congestion level currently associated with the hybrid vehicle, and
wherein determining that the heat rejection load represented by the received current-condition data is less than the heat rejection capacity of the cooling system comprises determining that the traffic congestion level indicated by the received current-condition data is less than a threshold traffic congestion level.

7. The hybrid vehicle of claim 2,
wherein the received current-condition data indicates a road grade currently associated with the hybrid vehicle, and
wherein determining that the heat rejection load represented by the received current-condition data is less than the heat rejection capacity of the cooling system comprises determining that the road grade indicated by the received current-condition data is less than a threshold road grade.

8. The hybrid vehicle of claim 2,
wherein the received current-condition data indicates a current speed of the hybrid vehicle, and
wherein determining that the heat rejection load represented by the received current-condition data is less than the heat rejection capacity of the cooling system comprises determining that the speed indicated by the received current-condition data is greater than a threshold speed.

9. The hybrid vehicle of claim 1, wherein the received expected-condition data comprises data indicating one or more of an expected air temperature, an expected traffic congestion level, an expected road grade, or expected road conditions.

10. The hybrid vehicle of claim 1,
wherein the received expected-condition data indicates an expected air temperature, and
wherein determining that the heat rejection load represented by the received expected-condition data is expected to become greater than the heat rejection capacity of the cooling system comprises determining that the temperature indicated by the received expected-condition data is greater than or equal to a threshold temperature.

11. The hybrid vehicle of claim 1,
wherein the received expected-condition data indicates an expected traffic congestion level, and
wherein determining that the heat rejection load represented by the received expected-condition data is expected to become greater than the heat rejection capacity of the cooling system comprises determining that the traffic congestion level indicated by the received expected-condition data is greater than or equal to a threshold traffic congestion level.

12. The hybrid vehicle of claim 1,
wherein the received expected-condition data indicates an expected road grade, and
wherein determining that the heat rejection load represented by the received expected-condition data is expected to become greater than the heat rejection capacity of the cooling system comprises determining that the road grade indicated by the received expected-condition data is greater than or equal to a threshold road grade.

13. The hybrid vehicle of claim 1, the functions further comprising:
requesting heat rejection load data that corresponds with an itinerary of the hybrid vehicle,
wherein receiving the expected-condition data comprises receiving the requested heat rejection load data.

14. The hybrid vehicle of claim 1,
wherein operating the hybrid vehicle in the first mode comprises operating the combustion engine at a throttle level that is greater than or equal to a threshold throttle level, and
wherein operating the hybrid vehicle in the second mode comprises operating the combustion engine at a throttle level that is less than the threshold throttle level.

15. The hybrid vehicle of claim 1,
wherein operating the hybrid vehicle in the first mode comprises operating the combustion engine at a duty cycle, and
wherein operating the hybrid vehicle in the second mode comprises operating the combustion engine to intermittently cycle between a first throttle level and a second throttle level that is less than the first throttle level.

16. The hybrid vehicle of claim 1, the functions further comprising:
making, after operating the hybrid vehicle in the second mode, a third determination that the heat rejection load of the cooling system has become less than or equal to the heat rejection capacity of the cooling system; and
operating, in response to making the third determination, the hybrid vehicle in the first mode.

17. The hybrid vehicle of claim 1, the functions further comprising:
making, after operating the hybrid vehicle in the second mode, a third determination that the heat rejection load of the cooling system has become less than or equal to the heat rejection capacity of the cooling system; and
providing an indication requesting that the power supply be recharged via an external power source.

18. The hybrid vehicle of claim 1, wherein the heat rejection capacity of the cooling system is based on an amount of heat that the cooling system is capable of dissipating.

19. A method of operating a hybrid vehicle, the method comprising:
receiving expected-condition data indicative of one or more expected operating conditions, wherein the one or more expected operating conditions are conditions external to the hybrid vehicle that are expected to be encountered by the hybrid vehicle;
making a first determination, based on the received expected-condition data, that a heat rejection load of a cooling system of the hybrid vehicle is expected to increase and become greater than a heat rejection capacity of the cooling system in response to the hybrid vehicle encountering the one or more expected operating conditions;
in response to making the first determination and prior to the hybrid vehicle encountering the expected operating conditions, operating the hybrid vehicle in a first mode wherein the combustion engine and the electric motor operate such that a charge level of the power supply increases or is maintained above a threshold charge level;

making, after operating the hybrid vehicle in the first mode, a second determination that the heat rejection load of the cooling system has become greater than the heat rejection capacity of the cooling system; and operating, in response to making the second determination, the hybrid vehicle in a second mode wherein the combustion engine and the electric motor operate such that the charge level of the power supply is below the threshold charge level.

20. A non-transitory computer readable medium storing instructions that, when executed by one or more processors of a hybrid vehicle, cause the hybrid vehicle to perform functions comprising:

receiving expected-condition data indicative of one or more expected operating conditions, wherein the one or more expected operating conditions are conditions external to the hybrid vehicle that are expected to be encountered by the hybrid vehicle;

making a first determination, based on the received expected-condition data, that a heat rejection load of a cooling system of the hybrid vehicle is expected to increase and become greater than a heat rejection capacity of the cooling system in response to the hybrid vehicle encountering the one or more expected operating conditions;

in response to making the first determination and prior to the hybrid vehicle encountering the expected operating conditions, operating the hybrid vehicle in a first mode wherein the combustion engine and the electric motor operate such that a charge level of the power supply increases or is maintained above a threshold charge level;

making, after operating the hybrid vehicle in the first mode, a second determination that the heat rejection load of the cooling system has become greater than the heat rejection capacity of the cooling system; and operating, in response to making the second determination, the hybrid vehicle in a second mode wherein the combustion engine and the electric motor operate such that the charge level of the power supply is below the threshold charge level.

\* \* \* \* \*